(12) United States Patent
Akiyama et al.

(10) Patent No.: US 12,110,047 B2
(45) Date of Patent: Oct. 8, 2024

(54) INFORMATION PROCESSING APPARATUS AND METHOD

(71) Applicant: KABUSHIKI KAISHA TOSHIBA, Tokyo (JP)

(72) Inventors: Sayaka Akiyama, Kawasaki (JP); Toru Yano, Shinagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 328 days.

(21) Appl. No.: 17/016,791

(22) Filed: Sep. 10, 2020

(65) Prior Publication Data

US 2021/0284209 A1 Sep. 16, 2021

(30) Foreign Application Priority Data

Mar. 16, 2020 (JP) .................................. 2020-045323

(51) Int. Cl.
| | |
|---|---|
| B61L 27/00 | (2022.01) |
| B61L 15/00 | (2006.01) |
| G06F 3/14 | (2006.01) |
| G06F 17/16 | (2006.01) |
| B60W 50/14 | (2020.01) |

(52) U.S. Cl.
CPC ....... *B61L 15/0081* (2013.01); *B61L 15/0072* (2013.01); *B61L 15/009* (2013.01); *G06F 3/14* (2013.01); *B60W 2050/146* (2013.01)

(58) Field of Classification Search
None
See application file for complete search history.

(56) References Cited

U.S. PATENT DOCUMENTS

| | | | | |
|---|---|---|---|---|
| 11,392,737 | B2 * | 7/2022 | Gotou | G06F 30/27 |
| 2002/0161495 | A1 | 10/2002 | Yamaki | |
| 2017/0178426 | A1 * | 6/2017 | Ezawa | B61K 9/00 |
| 2017/0278319 | A1 * | 9/2017 | Jung | G01L 5/286 |
| 2019/0226943 | A1 * | 7/2019 | Hayashi | G01M 13/045 |
| 2019/0301979 | A1 * | 10/2019 | Kawanoue | G05B 23/0254 |
| 2020/0210537 | A1 * | 7/2020 | Wang | G06F 30/20 |
| 2021/0048811 | A1 * | 2/2021 | Takata | G05B 23/0283 |
| 2021/0107539 | A1 * | 4/2021 | Howard | B61L 27/40 |
| 2022/0067850 | A1 * | 3/2022 | Bhasme | H02J 7/00716 |

FOREIGN PATENT DOCUMENTS

| | | | |
|---|---|---|---|
| JP | 2002-322948 A | | 11/2002 |
| JP | 2003022330 A | * | 1/2003 |
| JP | 2011-192110 A | | 9/2011 |

(Continued)

OTHER PUBLICATIONS

See Espacenet Translation of JP 2013253847 A, Minemura, 2013 (Year: 2013).*

*Primary Examiner* — Adam D Tissot
*Assistant Examiner* — Michael T Silva
(74) *Attorney, Agent, or Firm* — Oblon, McClelland, Maier & Neustadt, L.L.P.

(57) ABSTRACT

According to one embodiment, an information processing apparatus includes a processor. The processor is configured to detect a state of a device by applying device information on the device to a state detection model generated based on past device information on the device and characteristic information indicating characteristics of a moving body equipped with the device.

9 Claims, 9 Drawing Sheets

(56) References Cited

FOREIGN PATENT DOCUMENTS

| | | | |
|---|---|---|---|
| JP | 2013253847 A * | 12/2013 | |
| JP | 2017-109650 A | 6/2017 | |
| JP | 2018-173793 A | 11/2018 | |
| JP | 2019-22306 A | 2/2019 | |
| WO | WO-2019012730 A1 * | 1/2019 | .......... B61L 15/0081 |
| WO | WO-2019016996 A1 * | 1/2019 | .......... B61L 15/0081 |

\* cited by examiner

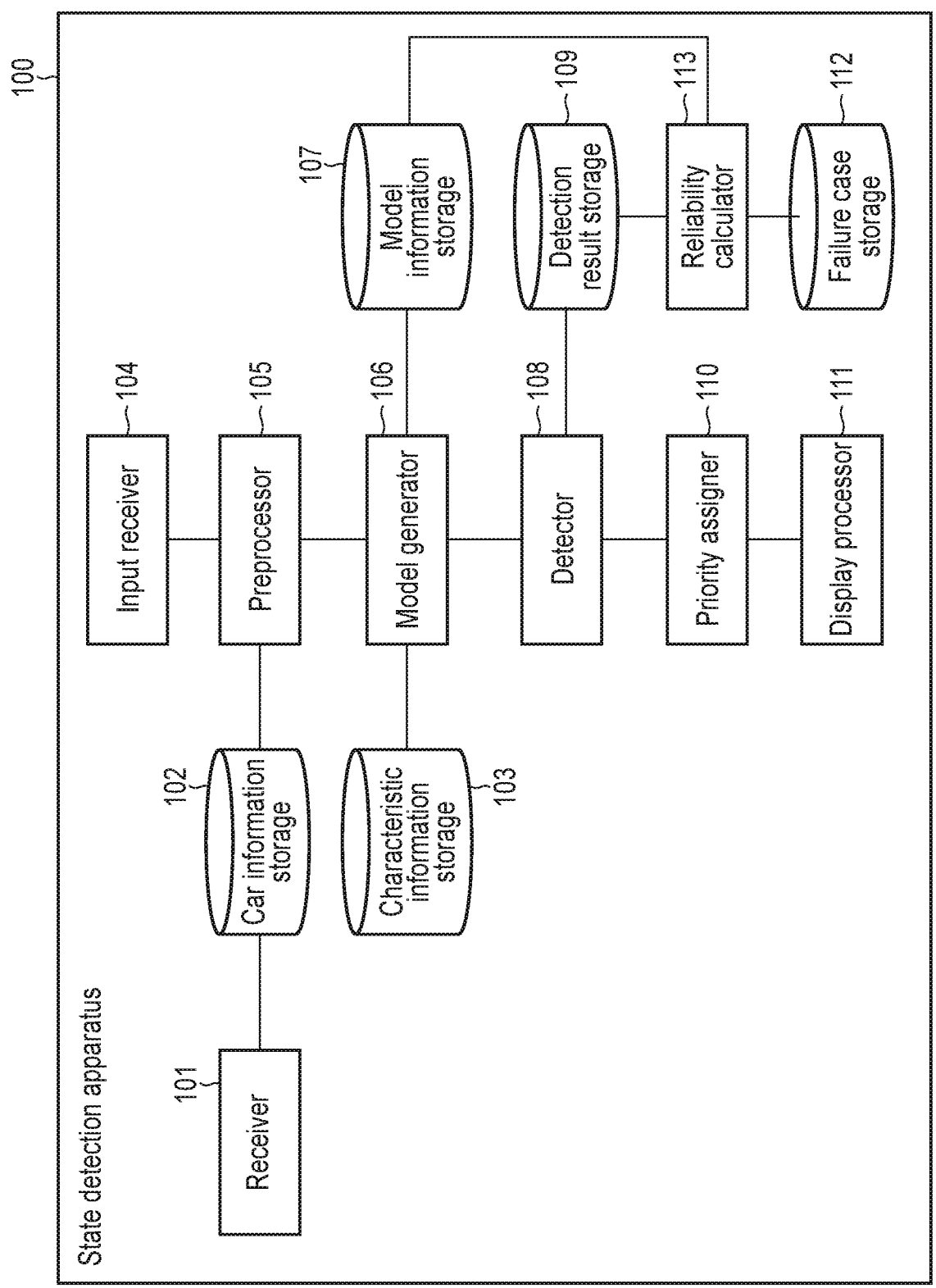
F I G. 1

102

| | 102a | 102b | 102c | 102d | |
|---|---|---|---|---|---|
| ID | 1 | 2 | 3 | 4 | ... |
| Date and time | 2019/11/03 11:23:34 | 2019/11/03 11:23:35 | 2019/11/03 11:23:36 | 2019/11/03 11:23:37 | ... |
| Car system | A | A | A | A | ... |
| Formation | 001 | 001 | 001 | 001 | ... |
| Departure station code | 5 | 5 | 5 | 5 | ... |
| Stop station code | 7 | 7 | 7 | 7 | ... |
| Kilometrage from departure station | 1923 | 1941 | 1952 | 1960 | ... |
| Travel direction | 0 | 0 | 0 | 0 | ... |
| Power running notch | 0 | 0 | 0 | 0 | ... |
| Brake notch | 4 | 4 | 3 | 3 | ... |
| Boarding rate (first car) | 1.10 | 1.17 | 1.30 | 1.26 | ... |
| Boarding rate (second car) | 0.93 | 0.98 | 1.10 | 1.03 | ... |
| ⋮ | ⋮ | ⋮ | ⋮ | ⋮ | ... |
| BC pressure command value (first car) | 360 | 370 | 280 | 250 | ... |
| BC pressure command value (second car) | 340 | 380 | 280 | 110 | ... |
| ⋮ | ⋮ | ⋮ | ⋮ | ⋮ | ... |
| BC pressure (first car) | 350 | 380 | 280 | 270 | ... |
| BC pressure (second car) | 350 | 380 | 280 | 110 | ... |
| ⋮ | ⋮ | ⋮ | ⋮ | ⋮ | ... |

FIG. 3

| | 103a | 103b | 103c | 103d | |
|---|---|---|---|---|---|
| Target ID | A001 | A002 | A003 | B001 | ... |
| Operator | X | X | X | X | ... |
| Car system | A | A | A | B | ... |
| Formation | 001 | 002 | 003 | 001 | ... |
| Number of cars | 6 | 6 | 6 | 4 | ... |
| Maximum operating speed | 90 | 90 | 90 | 92 | ... |
| Maximum design speed | 110 | 110 | 110 | 110 | ... |
| Starting acceleration | 3.0 | 3.0 | 3.0 | 4.0 | ... |
| Operation start time | 2004/8 | 2004/8 | 2004/8 | 2008/5 | ... |
| Formation capacity | 900 | 900 | 900 | 480 | ... |
| Number of M cars | 2 | 2 | 2 | 3 | ... |
| Number of T cars | 4 | 4 | 4 | 1 | ... |
| Travel section ID | Section 1 | Section 2 | Section 3 | Section 4 | ... |
| Device ID | Brake device 1 | Brake device 1 | Brake device 1 | Brake device 2 | ... |
| ⋮ | ⋮ | ⋮ | ⋮ | ⋮ | ... |

FIG. 4

| Travel section ID | Section 1 | Section 2 | ... |
|---|---|---|---|
| Operator | X | X | ... |
| Gradient | (0.26,0.68,2.0) (3.6,5.0,1.0) | (0.04,1.20,10.0) | ... |
| Tunnel | — | — | ... |
| Speed limit | (0.70,2.0,70) (8.5,10.0,85) | (0.0,1.3,68) | ... |
| ⋮ | ⋮ | ⋮ | ... |

107

| Model ID | Model 1 | Model 2 | ... |
|---|---|---|---|
| Learning period | 20171011 ~20180101 | 20171030 ~20171215 | ... |
| Device ID | Brake device 1 | Brake device 1 | ... |
| Objective variable | BC pressure | BC pressure | ... |
| First explanatory variable | BC pressure command value | BC pressure command value | ... |
| First weight | 0.85 | 0.9 | ... |
| Second explanatory variable | Boarding rate | Boarding rate | ... |
| Second weight | 0.7 | 0.73 | ... |
| Accuracy rate | 0.42 | 0.30 | ... |
| Learning validity | 0 | 1 | ... |
| Reliability | 0 | 0.30 | ... |
| ⋮ | ⋮ | ⋮ | ... |

| Target ID | A001 | A001 | ... |
|---|---|---|---|
| Device ID | Brake device 1 | Brake device 1 | ... |
| Mounting area ID | First car | Second car | ... |
| Period | 20180201 ~20180430 | 20180201 ~20180430 | ... |
| Model ID | Model 1 | Model 1 | ... |
| State change amount | 0.86 | 0.54 | ... |
| ⋮ | ⋮ | ⋮ | ... |

FIG. 8

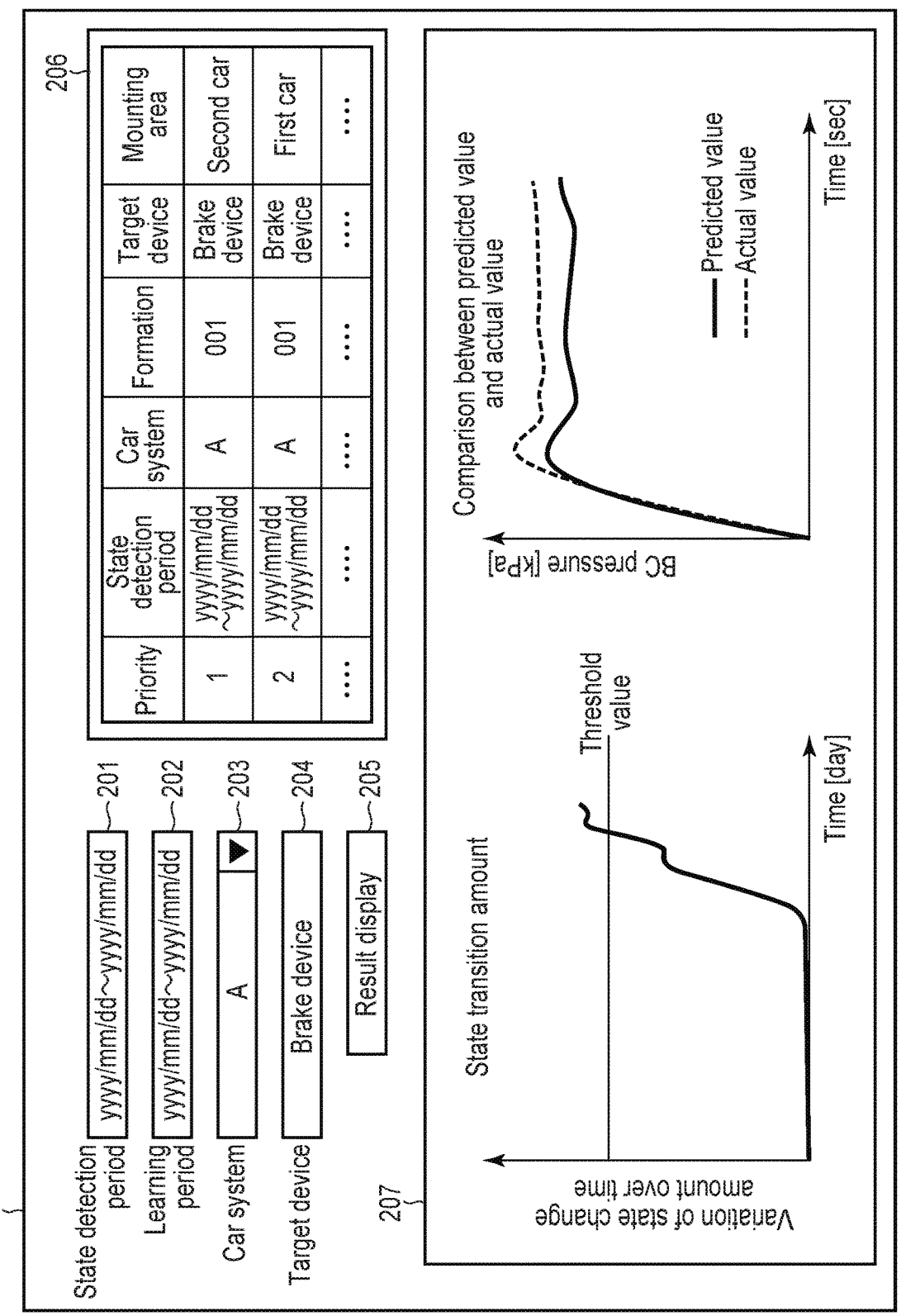
F I G. 10

| Occurrence date | 20180330 | 20180326 | ... |
|---|---|---|---|
| Target ID | A001 | A002 | ... |
| Device ID | Brake device 1 | Brake device 1 | ... |
| Mounting area ID | Second car | First car | ... |
| Travel distance | 15523 | 15519 | ... |
| Failure case code | Failure case code 1 | Failure case code 2 | ... |
| Procedure code | Procedure code 1 | Procedure code 2 | ... |
| ⋮ | ⋮ | ⋮ | ⋮ |

INFORMATION PROCESSING APPARATUS AND METHOD

CROSS-REFERENCE TO RELATED APPLICATIONS

This application is based upon and claims the benefit of priority from Japanese Patent Application No. 2020-045323, filed Mar. 16, 2020, the entire contents of which are incorporated herein by reference.

FIELD

Embodiments described herein relate generally to an information processing apparatus and a method.

BACKGROUND

Generally, for example, in a moving body (for example, a train) in which a plurality of car bodies move in a row, a device (hereinafter referred to as a target device) that controls air pressure according to a load of the car body is mounted on each car body. When the moving body is the train, the target device includes, for example, a brake device, a motor (main electric motor), and the like.

Even if the same type of target device (for example, a brake device) is mounted on each of the car bodies, it is common that different control is performed on the target device according to the load of each car body, and a usage load of the target device is different for each car body (that is, device).

In this case, since the target devices mounted on the car bodies are not in the same state, there should be a target device on which maintenance work (inspection work) should be preferentially performed even if they are the same type of target devices; however, it is difficult to discriminate the target device, which hinders smooth maintenance work.

BRIEF DESCRIPTION OF THE DRAWINGS

FIG. 1 is a block diagram illustrating an example of a functional configuration of a state detection apparatus according to an embodiment.

FIG. 3 is a diagram illustrating an example of a data structure of car information stored in a car information storage.

FIG. 4 is a diagram illustrating an example of a data structure of train basic information.

FIG. 7 is a diagram illustrating an example of a data structure of model information stored in a model information storage.

FIG. 8 is a diagram illustrating an example of detection results stored in a detection result storage.

FIG. 10 is a diagram illustrating an example of a screen displayed on the state detection apparatus.

DETAILED DESCRIPTION

Figure 2:
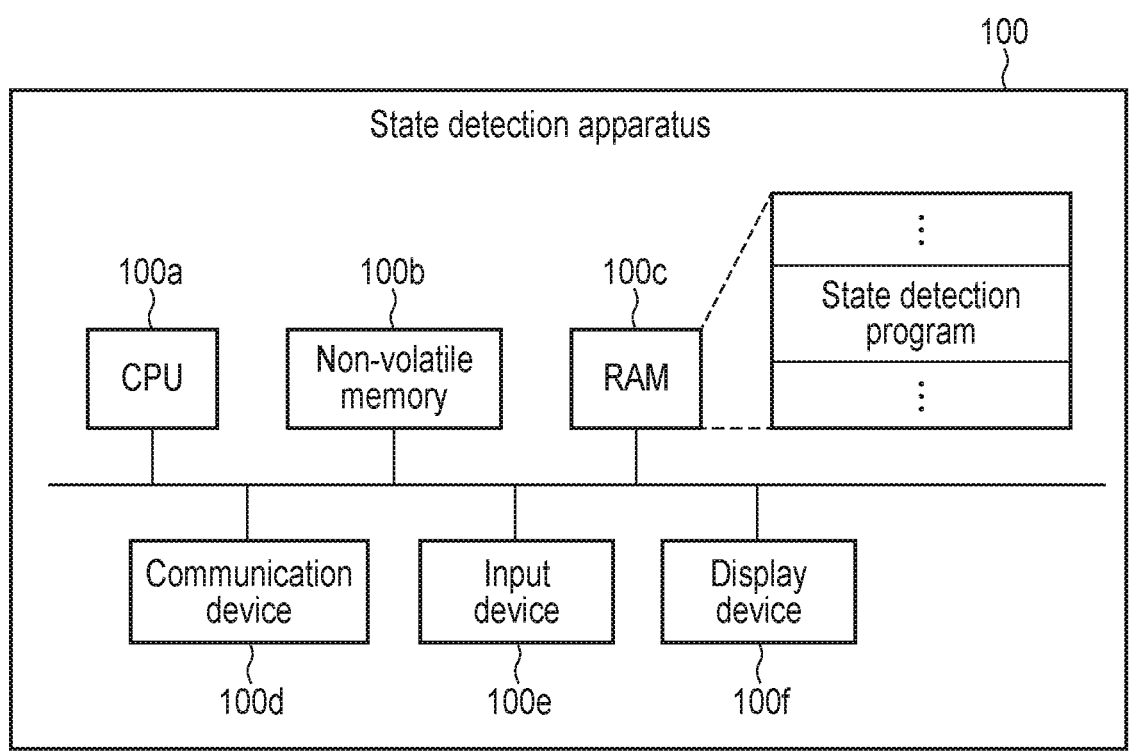
FIG. 2 is a diagram illustrating an example of a hardware configuration of the state detection apparatus.

In general, according to one embodiment, an information processing apparatus includes a processor.

The processor is configured to detect a state of a device by applying device information on the device to a state detection model generated based on past device information on the device and characteristic information indicating characteristics of a moving body equipped with the device.

Various embodiments will be described hereinafter with reference to the accompanying drawings.

FIG. 1 is a block diagram illustrating an example of a functional configuration of a state detection apparatus (information processing apparatus) according to the present embodiment. The state detection apparatus according to the present embodiment is used, for example, when the same type of device (hereinafter referred to as a target device) is mounted on each of a plurality of car bodies constituting a moving body, to detect a state of the target device.

In the present embodiment, for example, a train (or an electric train) in which a plurality of cars move in a row is assumed as the moving body. Each car constituting such a train is, for example, equipped with a brake device that decelerates (that is, brakes) the train (each car) by controlling air pressure according to a load.

Since such a brake device mounted on each car is subjected to different control according to the load that varies according to a boarding rate of the car, and the like, even if the brake device is mounted on the same train, an operating load (that is, a state) varies. Therefore, detecting the state of the brake device mounted on each car is useful for discriminating the brake device on which maintenance work or the like should be preferentially performed. In the present embodiment, the above-described brake device will be mainly described as the target device described above.

As illustrated in FIG. 1, a state detection apparatus 100 includes a receiver 101, a car information storage 102, a characteristic information storage 103, an input receiver 104, a preprocessor 105, a model generator 106, a model information storage 107, a detector 108, a detection result storage 109, a priority assigner 110, a display processor 111, a failure case storage 112, and a reliability calculator 113.

The receiver 101 receives device information on the target devices (brake devices) mounted on the train. Here, for example, an on-board system is provided on the train, and the receiver 101 receives car information transmitted from the on-board system as the device information regarding the target devices. The car information received by the receiver 101 is accumulated (stored) in the car information storage 102. Details of the car information will be described below.

The characteristic information storage 103 stores characteristic information indicating characteristics of the train equipped with the target devices. The characteristic information stored in the characteristic information storage 103 includes information (train basic information) including train design values, and information (train peripheral information) on a route on which the train travels (moves), and the like. The characteristic information is obtained, for example, from a server device or the like provided outside the state detection apparatus 100, and is stored in the characteristic information storage 103.

The input receiver 104 receives an instruction regarding state detection of the target device from a user who uses the state detection apparatus 100. The instruction received from the user by the input receiver 104 includes, for example, identification information (hereinafter referred to as a device ID) for identifying the target device whose state is to be detected by the state detection apparatus 100, and the like.

The preprocessor 105 extracts the car information from the car information storage 102 based on the above-mentioned instruction from the user, and performs preprocessing such as standardization or signal conversion on the car information. The car information preprocessed by the preprocessor 105 is stored in the car information storage 102.

The above-described preprocessing may be performed, for example, when the receiver 101 receives the car information. That is, the car information storage 102 may store the car information (raw data) received from the on-board system, or may store the car information after the preprocessor 105 performs the preprocessing.

The model generator 106 is a functional unit that performs processing related to a state detection model used to detect the state of the target device. Specifically, the model generator 106 generates at least one state detection model in which the characteristic information is considered, based on past car information preprocessed by the preprocessor 105 and the characteristic information stored in the characteristic information storage 103. The state detection model generated by the model generator 106 may be, for example, a physical model or a statistical model based on a statistical method. Further, the state detection model may be a combination of the physical model and the statistical model.

Information (parameters set in the state detection model, and the like) on the state detection model generated by the model generator 106 is stored in the model information storage 107. In this manner, the model information storage 107 stores, for example, information (hereinafter referred to as model information) on the state detection model generated in the past by the model generator 106.

For example, when the state detection model that can be used to detect the state of the target device has been generated in the past, the model generator 106 may acquire the parameters set in the state detection model from the model information storage 107 and generate the state detection model in which the parameters are set.

The model generator 106 may perform a process of updating the state detection model in which the parameters set in the state detection model generated in the past are set, based on the car information preprocessed by the preprocessor 105 and the characteristic information.

The state detection model may be updated from the physical model to the statistical model or from the statistical model to the physical model.

The detector 108 uses the state detection model generated by the model generator 106, to detect the states of the target devices (the same type of target devices mounted on the cars). The state of the target device is detected, for example, by applying the car information obtained by the on-board system during a period designated by the user to the state detection model. Detection results by the detector 108 are stored in the detection result storage 109.

The priority assigner 110 assigns a priority to each of the target devices based on the states of the target devices detected by the detector 108.

The display processor 111 performs a process of displaying the detection results by the detector 108 and the priority assigned to each of the target devices.

The failure case storage 112 stores information (hereinafter referred to as failure case information) indicating a failure case that has actually occurred in the target device mounted on each car constituting the train. It should be noted that the failure case is reported by, for example, a train crew member, a maintenance worker, or the like, and the failure case information indicating the failure case is obtained, for example, from an external server device or the like.

The reliability calculator 113 collates the detection results stored in the detection result storage 109 with the failure case information stored in the failure case storage 112 to calculate reliability of the state detection model generated by the model generator 106. The reliability of the state detection model calculated by the reliability calculator 113 is stored in the model information storage 107.

FIG. 2 illustrates an example of a hardware configuration of the state detection apparatus 100 illustrated in FIG. 1. The state detection apparatus 100 includes a CPU 100a, a non-volatile memory 100b, a RAM 100c, a communication device 100d, an input device 100e, a display device 100f, and the like.

The CPU 100a is a processor for controlling operations of various components in the state detection apparatus 100. The CPU 100a may be a single processor or may include a plurality of processors. The CPU 100a executes various programs loaded from the non-volatile memory 100b to the RAM 100c. In the present embodiment, the programs executed by the CPU 100a include a state detection program.

The non-volatile memory 100b is a storage medium used as an auxiliary storage device. The RAM 100c is a storage medium used as a main storage device. Although only the non-volatile memory 100b and the RAM 100c are illustrated in FIG. 2, the state detection apparatus 100 may include other storage devices such as a hard disk drive (HDD) and a solid state drive (SSD).

Some or all of the units 101, 104 to 106, 108, 110, 111, and 113 illustrated in FIG. 1 described above shall be realized by causing the CPU 100a (that is, a computer of the state detection apparatus 100) to execute the state detection program, that is, by software. The state detection program may be stored in a computer-readable storage medium and distributed, or may be downloaded to the state detection apparatus 100 through a network. Some or all of the above-mentioned units 101, 104 to 106, 108, 110, 111, and 113 may be realized by hardware such as an integrated circuit (IC) or may be realized by a combination of software and hardware.

In the present embodiment, the car information storage 102, the characteristic information storage 103, the model information storage 107, the detection result storage 109, and the failure case storage 112 are realized, for example, by the non-volatile memory 100b, or another storage device.

The communication device 100d is a device configured to perform wireless communication or wired communication with an external device (for example, the above-described on-board system and external server device).

The input device 100e includes, for example, a mouse and a keyboard. The display device 100f includes a liquid crystal display (LCD) or the like. The input device 100e and the display device 100f may be devices other than those described here.

FIG. 3 illustrates an example of a data structure of the car information stored in the car information storage 102 illustrated in FIG. 1. In the present embodiment, the car information is information that is obtained in the train (the on-board system provided in the train) as described above and is transmitted from the on-board system to the state detection apparatus 100, and includes at least one of monitor information, information on train operation records, and information obtained from a sensor or the like attached to the train or the target device mounted on the train. The car information illustrated in FIG. 3 indicates car information after the preprocessing is performed by the preprocessor 105.

As illustrated in FIG. 3, the car information includes an ID, a date and time, a car system, a formation, a departure station code, a stop station code, a kilometrage from departure station, a travel direction, a power running notch, a brake notch, a boarding rate (first car), a boarding rate (second car), a BC pressure command value (first car), a BC pressure command value (second car), a BC pressure (first car), and a BC pressure (second car).

The ID is an identifier assigned to the car information. The date and time indicates a date and time when the car information identified by an associated ID has been obtained in the train (on-board system).

The car system corresponds to a type of train, and the formation indicates formation of the train. The train where the car information has been obtained can be uniquely identified by the car system and the formation included in the car information.

The departure station code is a station code assigned to the departure station of the train. The stop station code is a station code assigned to a stop station of the train. That is, the car information is information obtained in the train running between the departure station to which the departure station code is assigned and the stop station to which the stop station code is assigned.

The kilometrage from the departure station indicates a distance from the departure station to a position of the train at the time when the car information is obtained.

The travel direction indicates a travel direction of the train. For example, when the train includes first to sixth cars, the travel direction "0" indicates a direction in which the first car is a head, and the travel direction "1" indicates a direction in which the sixth car is the head.

The power running notch indicates a driver's operation on train acceleration, and indicates a notch number (position) of the power running notch. The brake notch indicates the driver's operation on train deceleration (braking), and indicates the notch number (position) of the brake notch. In train operation, the train can be accelerated by increasing the notch number of the power running notch and can be decelerated (stopped) by increasing the notch number of the brake notch.

The boarding rate (first car) indicates a boarding rate of the first car among the cars constituting the train. The boarding rate (second car) indicates a boarding rate of the second car among the cars constituting the train. In FIG. 3, only the boarding rates of the first car and the second car are illustrated, but the car information also includes the boarding rates of other cars constituting the train.

While the brake device, which is the target device, is a device that controls the air pressure, the brake is applied by sending compressed air to a brake cylinder (BC) in the brake device.

The BC pressure command value (first car) indicates a BC pressure (brake cylinder pressure) command value (that is, a control value for the brake device) output to the brake device mounted on the first car when the brake is applied in this way. The BC pressure command value (second car) indicates a BC pressure command value (that is, the control value for the brake device) output to the brake device mounted on the second car when the brake is applied. In FIG. 3, only the BC pressure command values of the first car and the second car are illustrated, but the car information also includes the BC pressure command values of the other cars constituting the train.

On the other hand, the BC pressure (first car) is a BC pressure (actual value for operation of the brake device) actually measured in the brake device mounted on the first car operated based on the above-mentioned BC pressure command value (first car). The BC pressure (second car) is a BC pressure (actual value for operation of the brake device) actually measured in the brake device mounted on the second car operated based on the above-mentioned BC pressure command value (second car). In FIG. 3, only the BC pressures of the first car and the second car are illustrated, but the car information also includes the BC pressures of the other cars constituting the train.

In an example illustrated in FIG. 3, the car information storage 102 stores a plurality of pieces of car information including car information 102a to 102d.

For example, the car information 102a includes the ID "1", the date and time "2019/11/03 11:23:34", the car system "A", the formation "001", the departure station code "5", the stop station code "7", the kilometrage from departure station "1923", the travel direction "0", the power running notch "0", the brake notch "4", the boarding rate (first car) "1.10", the boarding rate (second car) "0.93", the BC pressure command value (first car) "360", the BC pressure command value (second car) "340", the BC pressure (first car) "350", and the BC pressure (second car) "350".

This indicates that the car information 102a to which the ID "1" is assigned has been obtained in the train (train specified by the car system "A" and the formation "001") at 11:23:34 on Nov. 3, 2019. The car information 102a indicates that when the car information 102a has been obtained in the train, the train has traveled between the departure station to which the departure station code "5" is assigned and the stop station to which the stop station code "7" is assigned, and is at a point 1923 m from the departure station. Further, the car information 102a indicates that the travel direction of the train when the car information 102a is obtained is the direction in which the first car is the head, the power running notch is 0, and the brake notch is 4 (that is, the train is decelerating).

Further, the car information 102a indicates that the boarding rate of the first car constituting the train is 1.10 and the boarding rate of the second car constituting the train is 0.93.

Further, the car information 102a indicates that the BC pressure command value output to the brake device mounted on the first car constituting the train is 360 kPa, whereas an actual BC pressure measured in the brake device is 350 kPa.

Similarly, the car information 102a indicates that the BC pressure command value output to the brake device mounted on the second car constituting the train is 340 kPa, whereas the actual BC pressure measured in the brake device is 350 kPa.

Although the car information 102a has been described here, the same applies to other car information including the car information 102b to 102d.

In the example illustrated in FIG. 3, the car information 102a to 102d is obtained every one second, and the car system, the formation, the departure station code, and the stop station code are common. That is, the car information 102a to 102d is car information obtained every one second in the same train specified by the car system "A" and the formation "001" during travel of the train.

In FIG. 3, it has been described that the ID, the date and time, the car system, the formation, the departure station code, the stop station code, the kilometrage from departure station, the travel direction, the power running notch, the brake notch, the boarding rate, the BC pressure command value, and the BC pressure are included in the car information. In the car information, however, some of the information may be omitted, or other information other than these may be further included.

Although FIG. 3 illustrates a case where the car information is time series information, the car information may be event information obtained, for example, when conditions such as a predetermined operation being performed by a driver are satisfied. The car information may be information in which the time series information and the event information are mixed. The car information may be discrete information or continuous information.

Next, the characteristic information stored in the characteristic information storage 103 illustrated in FIG. 1 will be described. As described above, the characteristic information stored in the characteristic information storage 103 includes the train basic information and the train peripheral information as described above.

FIG. 4 illustrates an example of a data structure of the train basic information. The train basic information is, for example, basic information on the train, such as the formation, the number of connected cars, a gauge, an electric system, a maximum operating speed, a maximum design speed, a starting acceleration, a deceleration, a formation capacity, an empty train formation weight, a total car length, a car body length, an overall width, an overall height, a gear ratio, information of on-board equipment and parts, and information of a section where the car travels.

In an example illustrated in FIG. 4, the train basic information includes an target ID, an operator, the car system, the formation, the number of cars, the maximum operating speed, the maximum design speed, the starting acceleration, an operation start time, the formation capacity, the number of M cars, the number of T cars, a travel section ID, and the device ID. Since the car system and the formation included in the train basic information are as described in the above train information, detailed description thereof will be omitted here.

The target ID is an identifier for identifying the train specified by the car system and the formation. The operator corresponds to a railway company or the like that operates the train identified by the target ID. The number of cars indicates the number of cars constituting the train identified by the target ID.

The maximum operating speed indicates an actual maximum operating speed of the train identified by the target ID, and the maximum design speed indicates a designed (theoretical) maximum operating speed of the train. The starting acceleration indicates acceleration when the target train starts moving from a state in which the train identified by the target ID is stopped.

The operation start time indicates a time (here, year and month) when the operation of the train identified by the target ID is started. The operation start time may be a date when the operation of the train identified by the target ID is started.

The formation capacity indicates the number of passengers who can board the train identified by the target ID.

The train includes a plurality of cars, and the cars include a motor car (a car equipped with a motor for driving the car) called an M car and a trail car (a car not equipped with the motor for driving the car) called a T car. The number of M cars included in the train basic information indicates the number of M cars among the cars constituting the train identified by the target ID. On the other hand, the number of T cars included in the train basic information indicates the number of T cars among the cars constituting the train identified by the target ID. A total value of the number of M cars and the number of T cars matches the number of cars included in the train basic information.

The travel section ID is an identifier for identifying a section (route) in which the train identified by the target ID travels.

The device ID is an identifier for identifying (the type of) the target device mounted on the train (each car constituting the train) identified by the target ID.

In the example illustrated in FIG. 4, the characteristic information storage 103 stores a plurality of pieces of train basic information including the train basic information 103a to 103d as the characteristic information.

For example, the train basic information 103a includes the target ID "A001", the operator "X", the car system "A", the formation "001", the number of cars "6", the maximum operating speed "90", the maximum design speed "110", the starting acceleration "3.0", the operation start time "2004/8", the formation capacity "900", the number of M cars "2", the number of T cars "4", the travel section ID "section 1", and the device ID "brake device 1".

The train basic information 103a indicates that the maximum operating speed of the train (train operated by the operator "X") identified by the target ID "A001" is 90 km/h, the maximum design speed of the train is 110 km/h, and the starting acceleration of the train is 3.0 km/h/s.

The train basic information 103a indicates that the operation start time of the train identified by the target ID "A001" is August 2004, and the number of passengers who can board the train is 900.

The train basic information 103a indicates that the number of M cars is two and the number of T cars is four among six cars constituting the train identified by the target ID "A001".

The train basic information 103a indicates that the train identified by the target ID "A001" travels in a section identified by the travel section ID "section 1", and the target device (brake device) identified by the device ID "brake device 1" is mounted on the train (each car constituting the train).

Although the train basic information 103a has been described here, the same applies to other train basic information including the train basic information 103b to 103d.

In FIG. 4, it has been described that the target ID, the operator, the car system, the formation, the number of cars, the maximum operating speed, the maximum design speed, the starting acceleration, the operation start time, the formation capacity, the number of M cars, the number of T cars, the travel section ID, and the device ID are included in the train basic information. In the train basic information, however, some of the information may be omitted, or other information other than these may be further included.

Figures 5, 6:
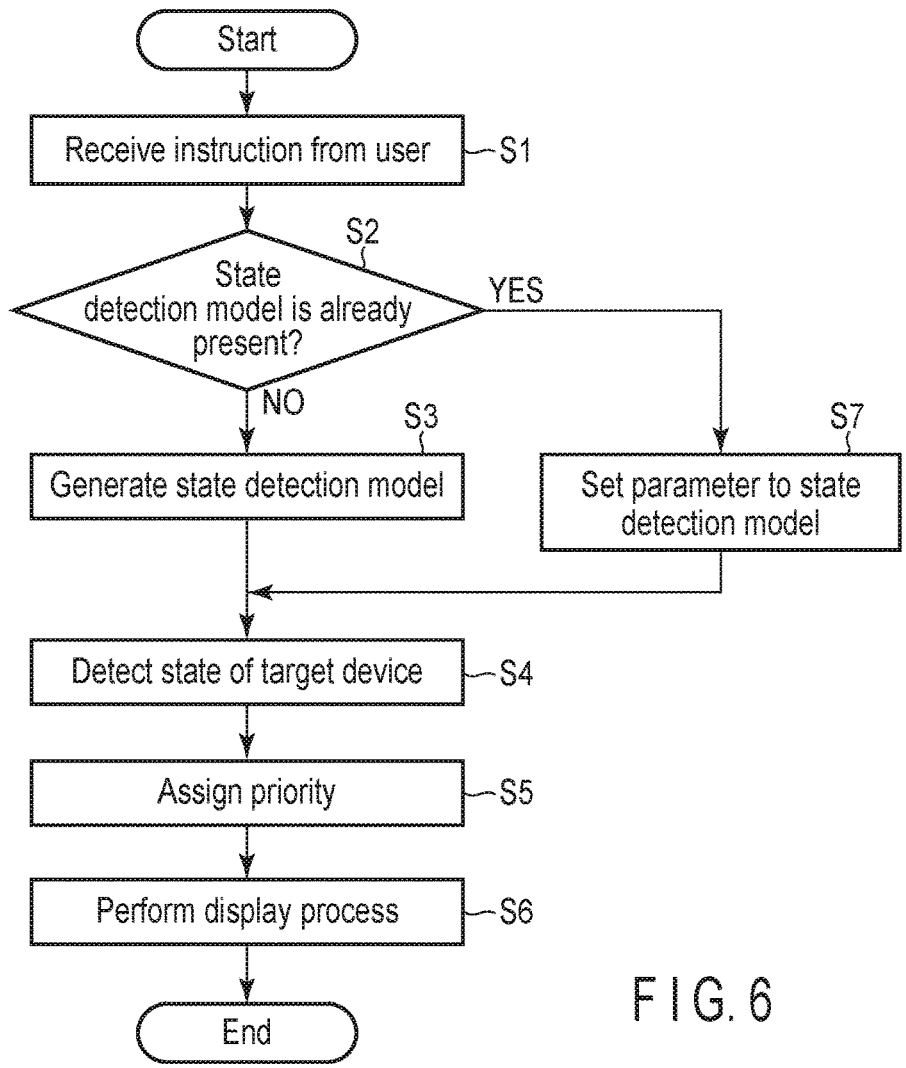
FIG. 5 is a diagram illustrating an example of a data structure of train peripheral information.
FIG. 6 is a flowchart illustrating an example of a processing procedure of the state detection apparatus when detecting a state of a target device.

FIG. 5 illustrates an example of a data structure of the train peripheral information. The train peripheral information is, for example, information on the route on which the train moves (travels), such as a section where the train travels.

As illustrated in FIG. 5, the train peripheral information includes the travel section ID, the operator, a gradient, a tunnel, and a speed limit.

The travel section ID is the same as the travel section ID included in the train basic information described above, and is an identifier for identifying the travel section of the train. The operator corresponds to the railway company or the like that operates the section identified by the travel section ID.

The gradient indicates a gradient (an inclination) present in the section identified by the travel section ID and a section where the gradient is present. Specifically, the gradient included in the train peripheral information is represented by a start point (start kilometrage) of the gradient, an end point (end kilometrage) thereof, and the gradient (inclination), when the start point of the travel section is used as a reference.

The tunnel indicates presence or absence of the tunnel (and the section of the tunnel) in the section identified by the travel section ID.

The speed limit indicates a speed limit in the section identified by the travel section ID and a section to which the speed limit is applied. Specifically, the speed limit included in the train peripheral information is indicated by the start point (start kilometrage), the end point (end kilometrage), and the speed limit of the section to which the speed limit is applied, when the start point of the travel section is used as the reference.

In an example illustrated in FIG. 5, a plurality of pieces of train peripheral information including train peripheral information 103A and 103B is stored as the characteristic information in the characteristic information storage 103.

For example, the train peripheral information 103A includes the travel section ID "section 1", the operator "X", the gradient "(0.26, 0.68, 2.0) (3.6, 5.0, 1.0)", the tunnel "-", and the speed limit "(0.70, 2.0, 70) (8.5, 10.0, 85)".

The train peripheral information 103A indicates that the travel section identified by the travel section ID "section 1" is operated by the operator "X".

Further, the gradient (0.26, 0.68, 2.0) included in the train peripheral information 103A indicates that the inclination is 2.0‰ (per mille) in a section from a point of 0.26 km to a point of 0.68 km with reference to the start point of the travel section identified by the travel section ID "section 1". Similarly, the gradient (3.6, 5.0, 1.0) included in the train peripheral information 103A indicates that the inclination is 1.0‰ in a section from a point of 3.6 km to a point of 5.0 km with reference to the start point of the travel section identified by the travel section ID "section 1".

The train peripheral information 103A indicates that there is no tunnel in the travel section identified by the travel section ID "section 1".

Further, the speed limit (0.70, 2.0, 70) included in the train peripheral information 103A indicates that the speed limit is 70 km/h in a section from a point of 0.70 km to a point of 2.0 km with reference to the start point of the travel section identified by the travel section ID "section 1". Similarly, the speed limit (8.5, 10.0, 85) included in the train peripheral information 103A indicates that the speed limit is 85 km/h in a section from a point of 8.5 km to a point of 10.0 km with reference to the start point of the travel section identified by the travel section ID "section 1".

Although the train peripheral information 103A has been described here, the same applies to other train peripheral information including the train peripheral information 103B.

In FIG. 5, it has been described that the travel section ID, the operator, the gradient, the tunnel, and the speed limit are included in the train peripheral information; however, in the train peripheral information, some of the information may be omitted, or other information other than these may be further included.

Although it has been described here that the characteristic information includes the train basic information and the train peripheral information, the characteristic information may further include, for example, other information such as design information (an assumed performance in designing the target device) of the target device (the brake device or the like) mounted on the train or the cars constituting the train.

Next, an example of a processing procedure of the state detection apparatus 100 when detecting the state of the target device will be described with reference to a flowchart in FIG. 6. It is assumed that the car information storage 102 has already stored the car information as illustrated in FIG. 3, and the characteristic information storage 103 has already stored the train basic information as illustrated in FIG. 4 and the characteristic information including the train peripheral information or the like as illustrated in FIG. 5.

When the state detection apparatus 100 detects the state of the target device, the user can instruct the state detection apparatus 100 to detect the state of the target device by operating the state detection apparatus 100 (the input device 100e included therein). In this case, the input receiver 104 receives the instruction from the user according to the user's operation on the state detection apparatus 100 (Step S1).

The instruction received from the user in Step S1 includes, for example, the device ID for identifying the target device, the car system (formation) of the train on which the target device is mounted, a period for detecting the state of the target device (hereinafter referred to as a state detection period) and a period in which the state detection model used to detect the state of the target device is learned (hereinafter referred to as a learning period).

As described above, the model information storage 107 stores the model information on the state detection model generated in the past.

FIG. 7 illustrates an example of a data structure of the model information stored in the model information storage 107. As illustrated in FIG. 7, the model information stored in the model information storage 107 includes a model ID, the learning period, the device ID, an objective variable, a first explanatory variable, a first weight, a second explanatory variable, a second weight, an accuracy rate, learning validity, and reliability.

The model ID is an identifier for identifying the state detection model generated in the past. The device ID is an identifier for identifying the device (target device) whose state can be detected using the state detection model identified by an associated model ID.

The objective variable indicates an objective variable in the state detection model identified by the model ID and corresponds to an output value of the state detection model.

The first explanatory variable indicates an explanatory variable in the state detection model identified by the model ID, and corresponds to an input value of the state detection model. The first weight indicates a weight for the first explanatory variable set in the state detection model identified by the model ID.

The second explanatory variable indicates an explanatory variable in the state detection model identified by the model ID, and corresponds to an input value of the state detection model. The second weight indicates a weight for the second explanatory variable set in the state detection model identified by the model ID.

The first and second weights included in the model information illustrated in FIG. 7 correspond to the parameters set in the state detection model identified by the model ID. The accuracy rate, the learning validity, and the reliability included in the model information will be described below.

In an example illustrated in FIG. 7, the model information storage 107 stores a plurality of pieces of model information including model information 107a and 107b.

For example, the model information 107a includes the model ID "model 1", the learning period "20171011 to 20180101", the device ID "brake device 1", the objective variable "BC pressure", the first explanatory variable "BC pressure command value", the first weight "0.85", the second explanatory variable "boarding rate", the second weight "0.7", the accuracy rate "0.42", the learning validity "0", and the reliability "0". The model information 107a indicates that the state detection model identified by the model ID "model 1" is a state detection model generated by learning the car information obtained in the train between Oct. 11, 2017 and Jan. 1, 2018, and is the state detection model for detecting the state of the target device (brake device) identified by the device ID "brake device 1".

The model information 107a indicates that by applying (inputting) the BC pressure command value and the boarding rate, which are the first and second explanatory variables, to the state detection model identified by the model ID "model 1", the BC pressure that is the objective variable is output from the state detection model as a predicted value.

The model information 107a indicates that 0.85 as the weight (first weight) of the first explanatory variable and 0.7 as the weight (second weight) of the second explanatory variable are set in the state detection model identified by the model ID "model 1".

According to the model information 107a, the accuracy rate is 0.42, the learning validity is 0, and the reliability is 0 in the state detection model identified by the model ID "model 1".

Although the model information 107a has been described here, the same applies to other model information including the model information 107b.

In FIG. 7, it has been described that the model ID, the learning period, the device ID, the objective variable, the first explanatory variable, the first weight, the second explanatory variable, the second weight, the accuracy rate, the learning validity, and the reliability are included in the model information; however, in the model information, some of the information may be omitted, or other information other than these may be further included.

The example illustrated in FIG. 7 illustrates, for example, the model information in which the first explanatory variable is the BC pressure command value, and the second explanatory variable is the boarding rate; however, the first and second explanatory variables may be other values and, for example, the values included in the car information or the characteristic information described above can be used.

Referring back to FIG. 6 again, in the following description, the target device identified by the device ID included in the instruction from the user is simply referred to as the target device, and the train specified from the car system (formation) included in the instruction from the user is referred to as the target train.

The model generator 106 refers to the model information stored in the model information storage 107, and determines whether the state detection model that satisfies the device ID, the car system, and the learning period included in the instruction from the user received in Step S1 is already present (generated) (Step S2).

In this case, when the model information during the learning period included in the instruction from the user (the model information including the learning period), which is the model information including the device ID for identifying the target device mounted on the target train, is stored in the model information storage 107, the model generator 106 determines the state detection model that satisfies the device ID, the car system, and the learning period included in the instruction from the user is already present. The target device (device ID for identifying the target device) mounted on the target train can be specified from the target ID (target ID for identifying the target train) and the device ID (device ID for identifying the target device) included in the train basic information illustrated in FIG. 4.

When it is determined that there is no state detection model that satisfies the device ID, the car system, and the learning period included in the instruction from the user (NO in Step S2), the model generator 106 considers the car characteristic information and, for example, the state detection model is newly generated for each travel section (Step S3).

In Step S3, the state detection model is generated based on the car information (hereinafter referred to as learning car information) obtained in the target train during the learning period included in the instruction from the user among the car information stored in the car information storage 102, and the characteristic information (the train basic information and the train peripheral information) indicating the characteristics of the target train among the characteristic information stored in the characteristic information storage 103. The learning car information is the car information that has been preprocessed by the preprocessor 105, and can be specified from the date and time, the car system, the formation, and the like included in each piece of the car information stored in the car information storage 102.

Specifically explaining a process of Step S3, the state detection model is generated by learning, for example, the boarding rate, (a data waveform of) the BC pressure and the BC pressure command value, and the like included in the learning car information described above as normal state information of the target device (brake device). In this case, for example, a learning method can be employed in which learning is performed using a moving average obtained by calculating an average value for each unit time elapsed from a start time of the operation of the target device (for example, the brake device) based on the learning car information. For example, information on the target device may be registered in advance separately as the objective variable and the explanatory variable in the model information storage 107, and a partial regression coefficient may be learned by applying a concept of multiple regression analysis.

The state detection model can be, for example, generated using a method such as support vector machine, linear regression, logistic regression, decision tree, regression tree, random forest, neural network, Bayesian inference, state space model, k-nearest neighbor algorithm, ensemble learning, association analysis, clustering, or self-organizing map.

The model information on the state detection model generated in Step S3 is stored in the model information storage 107.

When the process of Step S3 is performed, the detector 108 uses the state detection model generated in Step S3, and based on the same condition of the car characteristic information as when the state detection model is generated, detects the state of the target device (Step S4). When the state detection model is generated for each travel section as described above, the detector 108 detects the state of the target device mounted on the target train traveling the travel section (hereinafter referred to as a target travel section).

A process of Step S4 will be specifically described. As described above, it is assumed that the state detection model, in which the target device is the brake device, the objective variable is the BC value, and the explanatory variables (first and second explanatory variables) are the BC pressure command value and the boarding rate, is generated in Step S3.

In this case, the detector 108 acquires the car information (hereinafter referred to as state detection car information) obtained in the target train traveling the target travel section described above during the state detection period included in the instruction from the user among the car information stored in the car information storage 102. The state detection car information is the car information that has been preprocessed by the preprocessor 105, and can be specified from the date and time, the car system, the formation, and the like included in each piece of the car information stored in the car information storage 102.

Next, the detector 108 applies (inputs) the boarding rate and the BC pressure command value included in the state detection car information to the state detection model generated in Step S3, to acquire the (predicted value of) BC pressure output from the state detection model.

In this case, the detector 108 calculates a change amount of the state (hereinafter simply referred to as a state change amount) of the target device based on an obtained BC pressure (predicted value) and the BC pressure (actual value) included in the state detection car information. Specifically, the detector 108 calculates a deviation value (that is, a difference) between the predicted value of the BC pressure output from the state detection model and the actual value of (the BC pressure included in) the car information as the state change amount. The state change amount may be a value obtained by performing statistical processing on the deviation value calculated as described above, or the like. The state change amount may be, for example, a ratio of the BC pressure (predicted value) to the BC pressure (actual value) included in the car information (that is, degree of state change), or the like.

The state change amount calculated by the detector 108 as described above is output to the priority assigner 110 as a processing result (detection result by the detector 108) in Step S4 and stored in the detection result storage 109.

As described above, while the target device (brake device) is mounted on each car in the target train, the process of Step S4 is performed for each target device mounted on each car constituting the target train. That is, the detection result by the detector 108 includes the state change amount of each target device.

FIG. 8 illustrates an example of the detection results stored in the detection result storage 109. As illustrated in FIG. 8, the detection result includes the target ID, the device ID, a mounting area ID, the state detection period, the model ID, and the state change amount.

The target ID is the same as the target ID included in the train basic information illustrated in FIG. 4 described above, and specifically, an identifier for identifying the train (that is, the target train) specified from the car system (formation) included in the instruction from the user.

The device ID is an identifier for identifying the target device, and the mounting area ID is an identifier for identifying a car (car number) on which the target device is mounted among the cars constituting the train identified by the target ID.

The period is a period corresponding to the state detection period included in the instruction from the user. The model ID is an identifier for identifying the state detection model used for detecting the state of the target device identified by the device ID. The state change amount indicates a state change amount (that is, a detection result) calculated by the detector 108 using the state detection model identified by the model ID, and is the state change amount of the target device mounted on the car identified by the mounting area ID.

In an example illustrated in FIG. 8, the detection result storage 109 stores the detection results including detection results 109a and 109b.

For example, the detection result 109a includes the target ID "A001", the device ID "brake device 1", the mounting area ID "first car", the period "20180201 to 20180430", the model ID "model 1", and the state change amount "0.86".

The detection result 109a indicates that, for the target device (brake device identified by the device ID "brake device 1") mounted on the first car (car identified by the mounting area ID "first car") among the cars constituting the train to which the target ID "A001" is assigned, the state change amount is 0.86 during a period (state detection period) from Feb. 1, 2018 to Apr. 30, 2018.

The detection result 109a indicates that the state detection model identified by the model ID "model 1" is used to obtain the state change amount of the target device described above.

Although the detection result 109a has been described here, the same applies to other detection results including the detection result 109b.

In FIG. 8, it has been described that the target ID, the device ID, the mounting area ID, the period, the model ID, and the state change amount are included in the detection result; however, in the detection result, some of the information may be omitted, or other information other than these may be further included.

Returning to FIG. 6 again, the priority assigner 110 assigns a priority to each of the target devices based on the state change amount of each target device (Step S5). The priority assigned to each of the target devices in Step S5 corresponds to importance of the maintenance work or the like to be performed on the target device.

In Step S5, the priority assigned to each of the target devices is determined so that the target device with a large state change amount (deviation value) is assigned a high priority, and the target device with a small state change amount (deviation value) is assigned a low priority.

When a process of Step S5 is performed, the display processor 111 performs a process of displaying the priority assigned to each of the target devices in Step S5, for example, on the display device 100f or the like (Step S6).

On the other hand, when it is determined that the state detection model that satisfies the device ID, the car system, and the learning period included in the instruction from the user is already present (YES in Step S2), the model generator 106 acquires the model information on the state detection model from the model information storage 107, and sets the first and second weights (parameters) included in the obtained model information to the state detection model identified by the model ID included in the model information (Step S7).

When a process of Step S7 is performed, the processes of Step S4 and subsequent steps are performed by using the state detection model in which the parameters are set in Step S7.

For example, when there are a plurality of state detection models (model information) that satisfies the device ID, the car system, and the learning period included in the instruction from the user, an appropriate state detection model is selected from the state detection models. In selecting the appropriate state detection model, for example, the reliability or the like included in the model information can be used.

Hereinafter, an example of a screen displayed on (the display device 100f included in) the state detection apparatus 100 when the processes illustrated in FIG. 6 are performed will be described.

Figure 9:
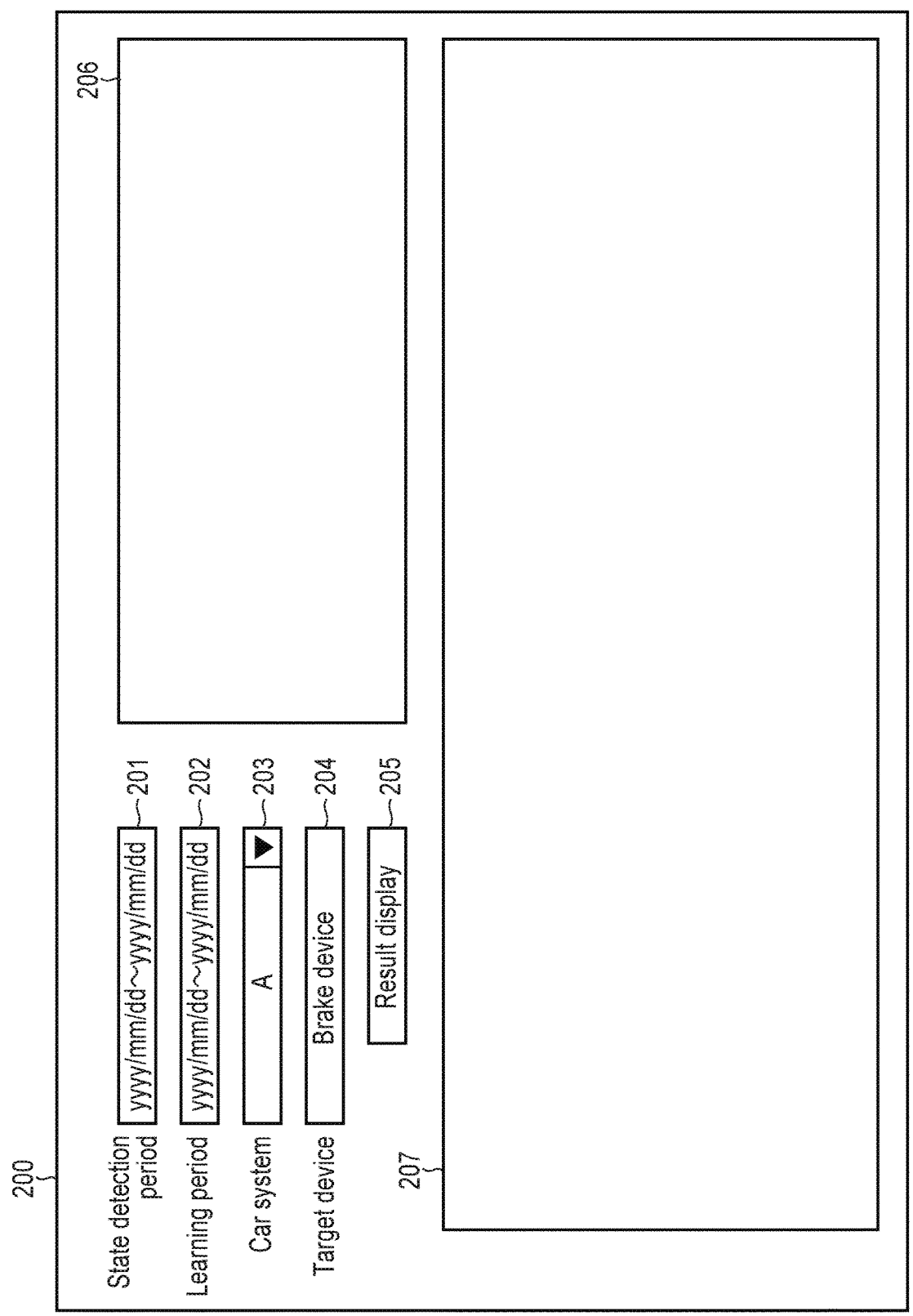
FIG. 9 is a diagram illustrating an example of a screen displayed on the state detection apparatus.

First, when the process illustrated in FIG. 6 is performed, a screen 200 (user interface) illustrated in FIG. 9 is displayed on the state detection apparatus 100.

The screen 200 is provided with a state detection period input field 201, a learning period input field 202, a car system input field 203, and a target device input field 204.

The user operates (the input device 100e included in) the state detection apparatus 100, so that the state detection period, the learning period, the car system, and the target device can be input to each of the above-mentioned fields 201 to 204 as the instruction from the user.

The screen 200 is further provided with a result display button 205. The user can instruct the state detection apparatus 100 to perform a process of detecting the state of the target device by pressing (designating) the result display button 205. That is, when the result display button 205 is pressed by the user, the process illustrated in FIG. 6 is performed based on the state detection period, the learning period, the car system, and the target device input as the instruction from the user.

The screen 200 is further provided with a priority display area 206 and a state change amount display area 207 in which the priority and the state change amount are displayed after the process illustrated in FIG. 6 has been performed.

When the process illustrated in FIG. 6 has been performed by the user pressing the result display button 205 on the screen 200 described above, the screen 200 transitions to a screen 210 illustrated in FIG. 10. In FIG. 10, the same parts as those in FIG. 9 are denoted by the same reference numerals.

As illustrated in FIG. 10, in the priority display area 206, the priority assigned to each of the target devices mounted on each car constituting the target train (train specified by the car system and the formation) is displayed. The smaller a numerical value of the priority, the higher the priority.

According to an example illustrated in FIG. 10, the user refers to the priority display area 206, to easily understand that the priority of the brake device (target device) mounted on the second car among the cars constituting the train having the car system "A" and the formation "001" is higher than the priority of the brake device mounted on the first car.

On the other hand, in the state change amount display area 207, the state change amount that is a basis of the priority displayed in the priority display area 206 is displayed.

Specifically, on a left side of the state change amount display area 207 illustrated in FIG. 10, the deviation value between a measured value of the BC pressure and the predicted value of the BC pressure is displayed as the state change amount together with variation during the state detection period.

In FIG. 10, variation of the state change amount of the target device calculated for each car information for one day (that is, for each day) during the state detection period is displayed.

On the left side of the state change amount display area 207, a preset threshold value for the state change amount is displayed, and when the state change amount (that is, deviation degree) exceeds the threshold value, it is possible to understand that the degree (that is, the priority) that the maintenance work is required for the target device is high.

On the right side of the state change amount display area 207 illustrated in FIG. 10, the predicted value and the actual value of the BC pressure during a period when the state change amount is large are displayed in a comparable manner.

Although it is assumed that the state change amount display area 207 displays the state change amount of the target device having the highest priority, the state change amount display area 207 may display the state change amount of another target device, or the user may be allowed to select (switch) the target device whose state change amount is displayed.

A display mode of the priority and the state change amount described in FIG. 10 is an example, and the priority and the state change amount may be displayed in another mode. Specifically, the priority and the state change amount assigned to each of the target devices mounted on each car constituting the target train may be simultaneously displayed in a distinguishable manner using colors or the like. In the priority display area 206, the target device may be classified according to a priority level, and displayed using a color corresponding to the classification, so that the priority (that is, the target device on which the maintenance work should be preferentially performed) can be easily recognized visually.

In FIGS. 9 and 10, it has been described that each of the input fields 201 to 204 and the result display button 205, and the priority display area 206 and the state change amount display area 207 are displayed on one screen; however, each of the input fields 201 to 204 and the result display button 205, and the priority display area 206 and the state change amount display area 207 may be displayed on different screens. Further, the priority display area 206 and the state change amount display area 207 may be switched and displayed.

For example, since the state change amount displayed in the state change amount display area 207 corresponds to the state of the target device detected by the state detection apparatus 100, the user can also determine necessity of the maintenance work for the target device from the state change amount. Therefore, in the present embodiment, the priority display area 206 may not be displayed, and only the state change amount display area 207 may be displayed. On the other hand, the state change amount display area 207 may not be displayed, and only the priority display area 206 may be displayed.

The above-mentioned priority and state change amount may be displayed, for example, in a table format or the like, or may be displayed in association with a graphic or the like that illustrates each car constituting the target train.

As described above, the model information storage 107 stores model information on the state detection model generated in the past, but in the present embodiment, it has a configuration for calculating the reliability of the state detection model. The failure case information stored in the failure case storage 112 is used to calculate the reliability of the state detection model.

Figures 11, 12:
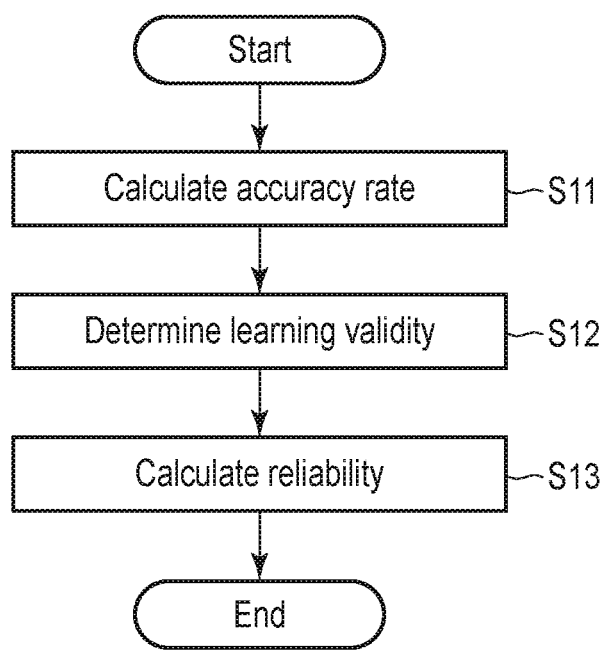
FIG. 11 is a diagram illustrating an example of a data structure of failure case information stored in a failure case storage.
FIG. 12 is a flowchart illustrating an example of a processing procedure of the state detection apparatus when calculating reliability of a state detection model.

FIG. 11 illustrates an example of a data structure of the failure case information stored in the failure case storage 112. As illustrated in FIG. 11, the failure case information includes an occurrence date, the target ID, the device ID, the mounting area ID, a travel distance, a failure case code, and a procedure code.

While the failure case information is information indicating the failure case, the occurrence date included in the failure case information indicates a date on which the failure case has occurred.

The target ID is an identifier for identifying the train specified by the car system and the formation as described above.

The device ID is an identifier for identifying the target device in which the failure case has occurred, and the mounting area ID is an identifier for identifying a car (car number) on which the target device is mounted among the cars constituting the train identified by the target ID.

The travel distance indicates a travel distance of the train identified by the target ID at the time when the failure case has occurred.

The failure case code is a code assigned to the failure case that has occurred, and the procedure code is a code assigned to the procedure taken for the failure case.

In an example illustrated in FIG. 11, the failure case storage 112 stores a plurality of pieces of failure case information including failure case information 112a and 112b.

For example, the failure case information 112a includes the occurrence date "20180330", the target ID "train 1", the device ID "brake device 1", the mounting area ID "second car", the travel distance "15523", the failure case code "failure case code 1", and the procedure code "procedure code 1".

The failure case information 112a indicates that in the target device (brake device) identified by the device ID "brake device 1" mounted on the second car (car identified by the mounting area ID "second car") among the cars constituting the train identified by the target ID "A001", a failure case to which the failure case code "failure case code 1" is assigned has occurred on Mar. 30, 2018.

Further, the failure case information 112a indicates that the traveling distance of the train identified by the target ID is 15523 km. Furthermore, the failure case information 112a indicates that the procedure to which the procedure code "procedure code 1" is assigned has been performed on the failure case to which the failure case code "failure case code 1" is assigned.

Although the failure case information 112a has been described here, the same applies to other failure case information including the failure case information 112b.

In FIG. 11, it has been described that the occurrence date, the target ID, the device ID, the mounting area ID, the traveling distance, the failure case code, and the procedure code are included in the failure case information; however, in the failure case information, some of the information may be omitted, or other information other than these may be further included.

Hereinafter, an example of a processing procedure of the state detection apparatus 100 in calculating the reliability of the state detection model will be described with reference to a flowchart of FIG. 12. Processes illustrated in FIG. 12 are performed by the reliability calculator 113.

It is assumed that the model information storage 107 stores the model information on the state detection model generated in the past, and processes of Steps S11 to S13 described below are performed for each state detection model. In the following description, the state detection model for which the reliability is generated will be referred to as a target model.

The reliability of the target model is calculated by collating the detection result stored in the detection result storage 109 with the failure case information stored in the failure case storage 112.

First, the reliability calculator 113 refers to the detection result storage 109 and acquires the detection result (that is, the detection result obtained by using the target model) including the model ID for identifying the target model.

Next, the reliability calculator 113 refers to the failure case storage 112 and specifies the number of failure case information (hereinafter referred to as the first number of failure cases) in which the state change amount (deviation value) exceeds the above-mentioned threshold value near the occurrence date, among the failure case information including the occurrence date in the period (state detection period) included in the detection result obtained in Step S11, and having the same target ID, the device ID, and the mounting area ID as the detection result.

Assuming that a total number of pieces of the failure case information including the occurrence date in the period included in the detection result obtained in Step S11, and having the same target ID, the device ID, and the mounting area ID as the detection result is the second number of failure cases, the reliability calculator 113 calculates the accuracy rate of the target model based on the state change amount (predicted value−measured value) included in the detection result, the first number of failure cases, and the second number of failure cases (Step S11).

In this case, the accuracy rate of the target model is calculated by, for example, "(state change amount)×(the first number of failure cases)/(the second number of failure cases)".

When a process of Step S11 is performed, the reliability calculator 113 determines the learning validity of the target model (Step S12).

The learning validity of the target model determined in Step S12 is, for example, a value of 0 or 1. Specifically, the reliability calculator 113 determines the learning validity of the target model to be 0 when the failure case has occurred during the learning period of the target model, and determines the learning validity of the target model to be 1 when the failure case has not occurred during the learning period of the target model. The fact that "the failure case has occurred during the learning period of the target model" can be grasped by the fact that the failure case information including the occurrence date in the learning period included in the model information including the model ID for identifying the target model, and having the same device ID with the model information is present in the failure case storage 112.

Next, the reliability calculator 113 calculates the reliability of the target model by multiplying the accuracy rate described above by the learning validity (that is, (accuracy rate)×(learning validity)) (Step S13).

The reliability calculated in Step S13 is added to the model information (that is, stored in the model information storage 107) including the model ID for identifying the target model together with the accuracy rate calculated in Step Sl1 and the learning validity determined in Step S12.

When 0 has been determined as the learning validity of the target model, the reliability of the target model is 0. In this case, the target model may be updated by performing learning with a period excluding the period in which the failure case has occurred from the learning period of the target model as a new learning period. The model information on the target model updated in this way is stored in the model information storage 107.

The reliability described here is an example and, for example, the reliability may be calculated using a result (an accuracy rate) or the like of determining whether the detection result stored in the detection result storage 109 is correct by using the failure case information stored in the failure case storage 112 as accurate information.

The reliability calculated by performing the process illustrated in FIG. 12 can be used in selecting an appropriate state detection model by referring to the model information storage 107 in the process (the process illustrated in FIG. 6) of detecting the state of the target device described above. Specifically, when there are the state detection models that satisfy the device ID, the car system, and the learning period included in the instruction from the user as described above, it is possible to select a state detection model with the highest reliability (that is, the state detection model in which the first and second weights included in the model information including the highest reliability are set), and use the state detection model for detecting the state of the target device.

As described above, in the present embodiment, the car information (device information) on the target devices (for example, brake devices) is received, and the received car information is applied to the state detection model generated based on the past car information (past device information) on the target devices and the characteristic information indicating the characteristics of the train (moving body) equipped with the target devices, so that the states of the target devices are detected and the detection result is displayed. In the present embodiment, the target devices are mounted on the cars (car bodies) constituting the train.

In the present embodiment, with such a configuration, since the state of each of the target devices, for example, mounted on different cars of the train can be provided (displayed) to the user, it is possible to realize the state detection apparatus 100 (information processing apparatus) useful to perform smooth maintenance work.

In the present embodiment, when the characteristic information includes the train peripheral information illustrated in FIG. 5 described above, the state detection model for each travel section can be, for example, generated in consideration of the characteristic information. When the travel section is different, an operation status of the target device also changes, and thus, in the present embodiment, by generating the state detection model for each travel section, it is possible to perform the state detection also in consideration of characteristics such as the section where the car (train) equipped with the target device travels.

In the present embodiment, based on the above detection results, the priorities may be assigned to the target devices and be displayed. With such a configuration, the user can easily determine which of the target devices needs to be preferentially maintained. That is, in the present embodiment, the priorities of the respective target devices (mounting areas) are presented for the target devices of the same type mounted on the different cars, so that efficiency of the maintenance work can be improved.

In the present embodiment, the car information includes the boarding rates of the cars, the control values for the target devices (for example, the BC pressure command values for the brake devices), and the actual values related to the operations of the target devices based on the control values (for example, the BC pressures for operating the brake devices). In the present embodiment, the characteristic information includes information including the train design values or information on the route on which the train moves. In the present embodiment, with such a configuration, it is possible to detect the state of the target device using the state detection model with the boarding rate and the BC pressure command value as explanation functions and the BC pressure as an objective function, and in consideration of the train design values or the route (that is, the characteristic of the train) on which the train moves, thereby improving the accuracy of the state detection of the target devices.

Furthermore, in the present embodiment, with a configuration of calculating the reliability of the state detection model used in detecting the states of the target devices based on the detection result of the states of the target devices and the failure case information indicating the failure cases has occurred in the target devices, it is possible to select an appropriate state detection model when the state detection model is reused.

The present embodiment has been described assuming that one target device (brake device) is mounted on each of the cars constituting the train; however, when one car is equipped with the target devices of the same type, it is also possible to detect the state of each car (mounting area) and display the priority of the maintenance work.

In the present embodiment, the user interface (UT) is provided in which the state detection period (a first period) and the learning period (a second period) designated by the user are input on the screen displayed on the state detection apparatus 100 (display device 100f), and the car information (device information) on the target devices during the state detection period is applied to the state detection model generated based on the car information (device information) on the target devices during the learning period, so that the detected states of the target devices are displayed. In the present embodiment, with such a configuration, it is possible to obtain the detection results (states of the target devices) intended by the user, thereby improving convenience for the user.

In the present embodiment, it has been described that the target devices (devices that control the air pressure according to the load) mounted on the cars (car bodies) constituting the train (moving body) is the brake devices. The target device may be, however, a motor or the like whose driving is controlled by a control device such as a VVVF inverter mounted on the cars constituting the train, for example. In this case, a state of the motor can be detected, for example, based on a rotation speed of the motor, a current value flowing in the motor, or the like included in the car information. The target device is not limited to the devices that control the air pressure according to the load, but may be, for example, a wheel whose diameter changes according to the load, or the like. In the present embodiment, the train has been mainly described as an example of the moving body; however, the moving body may be other than the train as long as the moving body is equipped with the target devices of the same type having different usage loads. The present embodiment may be applied to other than the moving body as long as it detects the states of the target devices of the same type having different usage loads.

In the present embodiment, it has been described that the state detection apparatus 100 includes the units 101 to 113; however, at least some of the units 101 to 113 may be disposed outside the state detection apparatus 100. Specifically, for example, the preprocessor 105 may be disposed in the server device disposed outside the state detection apparatus 100, so that the preprocessing for the car information may be performed in the server device. For example, at least some of the car information storage 102, the characteristic information storage 103, the model information storage 107, the detection result storage 109, and the failure case storage 112 may be, for example, disposed in the server device (for example, a cloud server) or the like disposed outside the state detection apparatus 100.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus, comprising:
processing circuitry configured to detect a state of a device by applying device information on the device to a state detection model generated based on past device information on the device and characteristic information indicating characteristics of a moving body equipped with the device,
wherein the processing circuitry is further configured to select the state detection model from a plurality of state detection models, based on a calculated reliability of each of the plurality of state detection models, the reliability being calculated, for each model of the plurality of state detection models, by
  (1) determining a first value indicating a number of times for which the model output a value indicating a failure of the device that occurred during a predetermined past time period,
  (2) determining a second value indicating a number of actual failures that occurred for the device in the predetermined past time period,
  (3) determining an accuracy by multiplying a state change amount by the determined first value and dividing by the determined second value,
  (4) determining a learning validity value, which is zero when a failure case occurred during a training period of the model and is one when the failure case did not occur during the training period, and
  (5) determining the reliability by multiplying the determined accuracy by the determined learning validity value.

2. The information processing apparatus according to claim 1, wherein the processing circuitry is further configured to receive the device information.

3. The information processing apparatus according to claim 1, wherein the processing circuitry is further configured to display one of the detection results.

4. The information processing apparatus according to claim 3, wherein the processing circuitry is further configured to:
  detect a corresponding state of each of a plurality of devices;
  assign a corresponding priority to each of the plurality of devices based on the detected states; and
  display the assigned priorities assigned to the plurality of devices.

5. The information processing apparatus according to claim 4, wherein a plurality of target devices is mounted on a plurality of car bodies constituting the moving body.

6. The information processing apparatus according to claim 5, wherein the device information comprises boarding rates of the plurality of car bodies, control values for the plurality of devices, and actual values related to operations of the plurality of devices based on the control values.

7. The information processing apparatus according to claim 1, wherein the characteristic information comprises information including a design value of the moving body or information on a route on which the moving body moves.

8. An information processing apparatus, comprising:
processing circuitry configured to
  input first and second periods designated by a user; and
  display a state of a device detected by applying device information on the device during the first period to a state detection model generated based on device information on the device during the second period,
wherein the processing circuitry is further configured to select the state detection model from a plurality of state detection models, based on a calculated reliability of each of the plurality of state detection models, the reliability being calculated, for each model of the plurality of state detection models, by
  (1) determining a first value indicating a number of times for which the model output a value indicating a failure of the device that occurred during a predetermined past time period,
  (2) determining a second value indicating a number of actual failures that occurred for the device in the predetermined past time period,
  (3) determining an accuracy by multiplying a state change amount by the determined first value and dividing by the determined second value,
  (4) determining a learning validity value, which is zero when a failure case occurred during a training period of the model and is one when the failure case did not occur during the training period, and
  (5) determining the reliability by multiplying the determined accuracy by the determined learning validity value.

9. A method, comprising:
detecting, by processing circuitry, a state of a device by applying device information on the device to a state detection model generated based on past device information on the device and characteristic information indicating characteristics of a moving body equipped with the device,
wherein the method further comprises selecting, by the processing circuitry, the state detection model from a plurality of state detection models, based on a calculated reliability of each of the plurality of state detection models, the reliability being calculated, for each model of the plurality of state detection models, by
  (1) determining a first value indicating a number of times for which the model output a value indicating a failure of the device that occurred during a predetermined past time period,
  (2) determining a second value indicating a number of actual failures that occurred for the device in the predetermined past time period,
  (3) determining an accuracy by multiplying a state change amount by the determined first value and dividing by the determined second value,
  (4) determining a learning validity value, which is zero when a failure case occurred during a training period of the model and is one when the failure case did not occur during the training period, and
  (5) determining the reliability by multiplying the determined accuracy by the determined learning validity value.

* * * * *